United States Patent
Mehta et al.

(10) Patent No.: US 12,041,507 B2
(45) Date of Patent: Jul. 16, 2024

(54) CELLULAR NETWORK USER DEVICE MOBILITY OPTIMIZATION MANAGEMENT

(71) Applicant: DISH Wireless L.L.C., Englewood, CO (US)

(72) Inventors: Dhaval Mehta, Aldie, VA (US); Amit Pathania, Herndon, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 233 days.

(21) Appl. No.: 17/353,568

(22) Filed: Jun. 21, 2021

(65) Prior Publication Data
US 2022/0408334 A1  Dec. 22, 2022

(51) Int. Cl.
*H04W 36/30* (2009.01)
*G06N 20/00* (2019.01)
*H04W 36/00* (2009.01)
*H04W 36/08* (2009.01)
*H04W 36/36* (2009.01)

(52) U.S. Cl.
CPC ............ *H04W 36/30* (2013.01); *G06N 20/00* (2019.01); *H04W 36/0085* (2018.08); *H04W 36/08* (2013.01); *H04W 36/36* (2013.01)

(58) Field of Classification Search
CPC . H04W 36/30; H04W 36/0085; H04W 36/08; H04W 36/36; H04W 24/04; H04W 24/02; G06N 20/00
See application file for complete search history.

(56) References Cited

U.S. PATENT DOCUMENTS

| | | | | |
|---|---|---|---|---|
| 11,356,911 | B1* | 6/2022 | Chukka | H04W 36/0085 |
| 2015/0063144 | A1* | 3/2015 | Kozat | H04W 40/12 |
| | | | | 370/252 |

(Continued)

FOREIGN PATENT DOCUMENTS

| WO | 2021/064713 A1 | 4/2021 | |
|---|---|---|---|
| WO | WO-2021064713 A1 * | 4/2021 | ........ H04W 36/0083 |

OTHER PUBLICATIONS

3rd Generation Partnership Project; Technical Specification Group Services and System Aspects; Architecture enhancements for 5G System (5GS) to support network data analytics services (Release 17), 3GPP TS 23.288 V 17.0.0 (Mar. 2021), Technical Specification, 160 pages.

(Continued)

*Primary Examiner* — Gary Mui
*Assistant Examiner* — Yewon Kim
(74) *Attorney, Agent, or Firm* — Seed IP Law Group LLP

(57) ABSTRACT

Systems and methods to utilize user device self-reported quality metrics and machine learning mechanisms to optimize management of user device mobility in a cellular network. Cells in the network obtain quality data for one or more user devices in communication with the cells, including channel-quality-indicator values, reference-signal-received-power values, and reference-signal-received-quality values. The quality data is processed by a machine learning mechanism to generate a separate quality report for each cell. In response to receiving a request to handover communications for a target user device, the quality reports are utilized to select a cell that is predicted to provide the best quality communications for the target user device.

20 Claims, 5 Drawing Sheets

(56) References Cited

U.S. PATENT DOCUMENTS

| | | |
|---|---|---|
| 2015/0098387 A1 | 4/2015 | Garg et al. |
| 2019/0319868 A1 | 10/2019 | Svennebring et al. |
| 2020/0260342 A1* | 8/2020 | Vaidya .............. H04W 36/0083 |
| 2021/0029607 A1* | 1/2021 | Zhou .................... H04W 36/245 |
| 2021/0099942 A1 | 4/2021 | Tripathi et al. |
| 2023/0209450 A1* | 6/2023 | Cao ....................... H04W 48/16 |
| | | 370/338 |

OTHER PUBLICATIONS

International Search Report and Written Opinion for PCT/US2022/033539, dated Sep. 30, 2022, 17 pages.

\* cited by examiner

CELLULAR NETWORK USER DEVICE MOBILITY OPTIMIZATION MANAGEMENT

TECHNICAL FIELD

The present disclosure relates generally to digital message communications and, more particularly, to utilizing user device self-reported quality metrics to optimize management of user device mobility in a cellular network.

BACKGROUND

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The increase in the number of smart phones, however, has also resulted in increased cellular traffic. As people move around, cell nodes need to handover service of smart phones to other cell nodes, such as when a smart phone is too far from a current cell or when the current cell is experiencing too much traffic. Many cell nodes and towers utilize load balancing to determine which cell is to handle which user device traffic. Such load balancers often rely on latency and throughput as factors when determining which cell is to handle communications for which user device. Unfortunately, these factors do not provide an accurate representation of the actual service quality that a user device will experience after the handover from one cell to another. It is with respect to these and other considerations that the embodiments described herein have been made.

BRIEF SUMMARY

Briefly described, embodiments are directed toward systems and methods of utilizing user device self-reported quality metrics and machine learning mechanisms to optimize management of user device mobility in a cellular network, a cell quality server requests each cell in a network to obtain quality data for one or more user devices in communication with the cells. Each corresponding cell then send requests to one or more user devices that are utilizing that corresponding cell for communications. The user devices respond by providing the quality data to the corresponding cell. The quality data may include a reference-signal-received-power value and a reference-signal-received-quality value. The cells may also obtain a channel-quality-indicator value from the user devices. The cells provide the obtained quality data to the cell quality server.

The cell quality server utilizes one or more machine learning mechanisms to generate a separate quality report for each cell based on the quality data. Each quality report may be a quality model that estimates the current quality of a user device based on historical reference-signal-received-power values, historical reference-signal-received-quality values, and corresponding historical channel-quality-indicator values provided by user devices. In this way, the cell quality server, or a cell, can determine if a target cell is to handle communications for a target user device in response to receiving a request to handover communications for the target user device. The quality reports are utilized to select a cell that is predicted to provide the best quality communications for the target user device.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
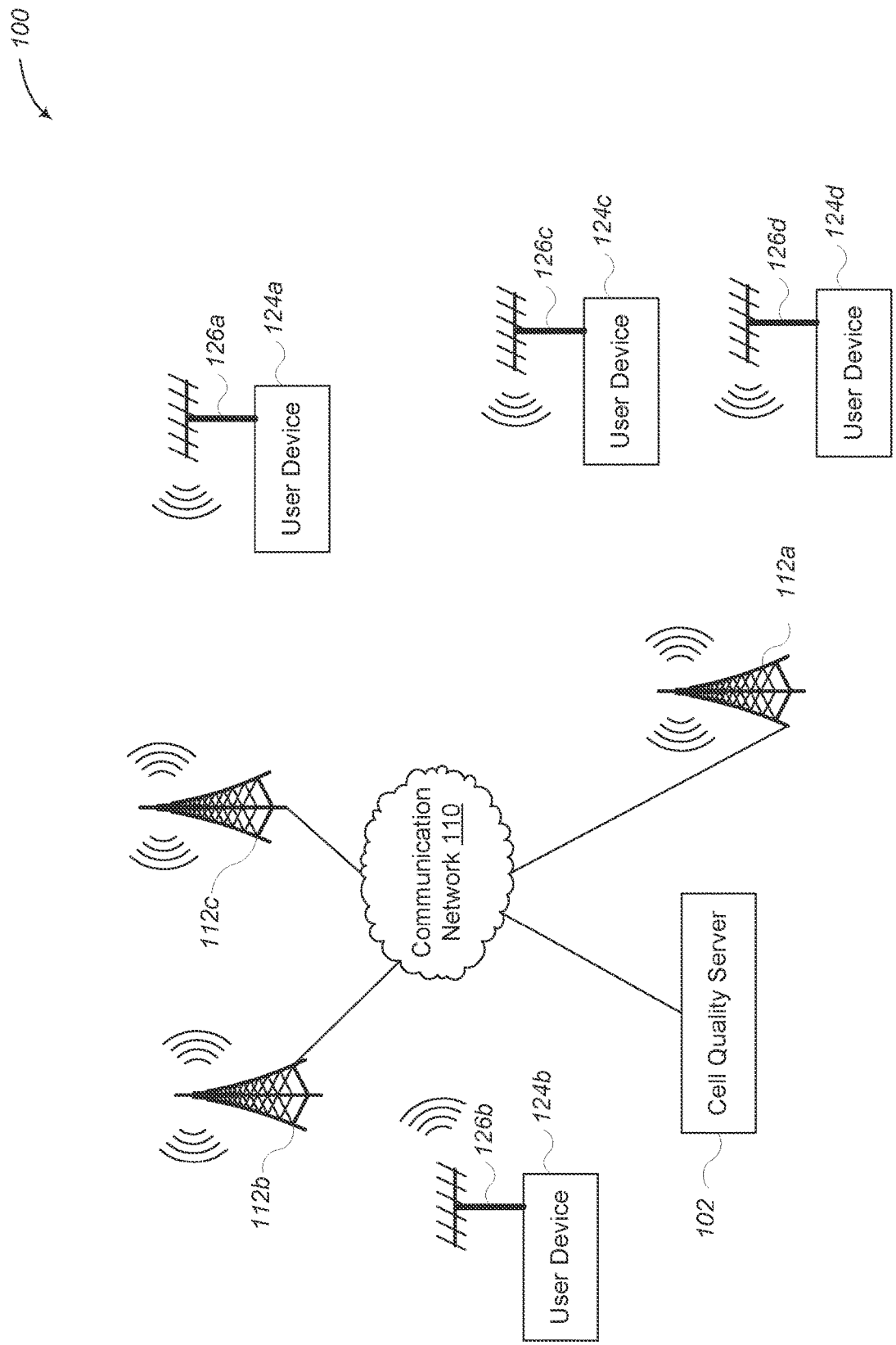
FIG. 1 illustrates a context diagram of an environment for determining cell quality for user device mobility optimization in accordance with embodiments described herein.

FIG. 1 illustrates a context diagram of an environment for determining cell quality for user device mobility optimization in accordance with embodiments described herein. Environment 100 includes a plurality of cells 112a-112c (collectively or individually referred to as cell 112), a plurality of user devices 124a-124d (collectively or individually referred to as cell 124), a cell quality server 102, and a communication network 110. Communication network 110 includes one or more wired or wireless networks, which may include a series of smaller or private connected networks that carry information among the cells 112a-112c and the cell quality server 102.

The cells 112a-112c are cellular towers that together implement a cellular communications network. The cells 112a-112c may include or be in communication with base stations, radio back haul equipment, antennas, or other devices, which are not illustrated for ease of discussion. In various embodiments, the cells 112a-112c may communicate with each other via communication network 110. Each cell 112 provides cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. The overall capacity of the network created by the cells 112a-112c depends on the coverage of each cell 112 and the interference that the cells 112 may have on each other. Because of interference, communication loads, latency, environmental effects, and other factors, the quality of communications between the user devices 124a-124d and the cells 112a-112c can vary from cell to cell and from time to time.

The user devices 124a-124d are computing devices that receive and transmit cellular communication messages with the cells 112a-112c via antennas 126a-126d, respectively. Examples of user devices 124a-124d may include, but are not limited to, mobile devices, smartphones, tablets, cellular-enabled laptop computers, or other computing devices that can communication with a cellular network.

The cell quality server 102 collects quality data from the cells 112a-112c to generate quality reports for each separate cell 112a-112c. The cell quality server 102 may include one or more server devices, cloud computing resources, or other computing devices that perform embodiments described herein.

In particular, the cell quality server 102 transmits a request to each cell 112a-112c to obtain quality data from user devices 124a-124d. The cells 112a-112c respond by requesting the quality data from those user devices 124a-124d that are in communication with the corresponding cell. For example, assume user device 124b is in communication with cell 112b, user device 124a is in communication with cell 112c, and user devices 124c and 124d are in communication with cell 112a. In this example, cell 112b will request specific quality data from user device 124b, cell 112c will request specific quality data from user device 124a, and cell 112a will request specific quality data from both user device 124c and user device 124d.

The requested quality data may include channel-quality-indicator values, reference-signal-received-power values, reference-signal-received-quality values, signal-to-noise ratio, or a combination thereof. In some embodiments, the cells 112a-112c may obtain and store some of the quality data as part of normal communications with user devices 124a-124d. In other embodiments, the cells 112a-112c may specifically request some of the quality data from the user devices 124a-124d. Other information associated with the quality data may also be obtained. For example, the frequency band being used when the quality data was collected may also be obtained.

Once obtained, the cells 112a-112c provide the quality data to the cell quality server 102. The cell quality server 102 can then utilize one or more machine learning or artificial intelligence mechanisms to generate one or more quality reports or models for each cell 112a-112c. These quality reports can then be used to predict the communication quality between a target user device 124 and one or more neighboring cells 112, which may also be referred to as a predictive user quality indicator for the target user device for that particular cell.

For example, if user device 124c is moving out of the range of cell 112a and into the range of cells 112b and 112c, cell 112a can send a handover request to cell quality server 102. The cell quality server 102 can utilize the quality reports of cells 112b and 112c, along with other information, to estimate a predictive user quality indicator for each of cells 112b and 112c. From this information, the cell quality server 102 determines which cell is likely to provide better communication quality to user device 124c. If the cell quality server 102 determines that cell 112b is likely to provide the better or higher quality communications with user device 124c (e.g., the target user device has a higher predictive user quality indicator with cell 112b compared to cell 112c), then the cell quality server 102 can inform the cells 112a and 112b to perform a handover of communications for user device 124c from cell 112a to cell 112b. Accordingly, the cell quality server 102 is using the generated quality reports for a plurality of cells to predict the user experience for a target user device in communication with those cells.

In some embodiments, the quality reports can also be used to predict the communication quality between a target user device 124 and one or more cells 112 for different frequency bands. For example, quality reports for different frequency bands for the current cell handling communications with the target user, or quality reports for different frequency bands for other cells, may be used to determine which frequency band is predicted to provide the best user experience, whether the current cell or a different cell.

In various embodiments, the cell quality server 102 may share the quality reports for cells 112 that neighbor or are in the vicinity of other cells 112. In at least one embodiment, a cell may be in the vicinity of another cell if the cells can perform a handover of user device communications between the cells. Accordingly, a cell 112 may store the quality reports for neighboring cells or for other cells that it can handover user device communication. For example, if cell 112a can handover communications for a user device to cell 112c, but not cell 112b (e.g., because cell 112b is too far away to handle communications for the user device), then cell 112a may store the quality report for cell 112c and cell 112c may store the quality report for cell 112a. In this example, cell 112c may also store the quality report of cell 112b if those two cells can handover communications of user devices. By having cells 112 store associated quality reports of other neighboring cells 112, the cells 112 can utilize those quality reports when determining which cell is to handle communications for a target user device when a communication handover is needed.

In some embodiments, each cell 112 may perform embodiments of the cell quality server 102 to generate their own quality reports. The cells 112 can then share their own quality reports with other cells in the vicinity. Accordingly, embodiments described herein may be performed by the cell quality server 102, the cells 112a-112c, or a combination thereof.

In various embodiments, the cell quality server 102, or the cells 112, may monitor the communication quality after a handover is performed. In at least one embodiment, a new cell that is handling communications for a target user device requests current quality data (e.g., a channel-quality-indicator value, a reference-signal-received-power value, a reference-signal-received-quality value, a signal-to-noise ratio, etc.) from the target user device. If the current quality data does not align with the predicted user experience, as determined from the quality report of the new cell prior to the handover, then the cell quality server 102, or the new cell, can update quality report for the new cell based on the current quality data. In this way, the quality reports of the cells can be updated to align predicted user experience with actual user experience.

In some embodiments, the cell quality server 102, or the cells 112, may stop utilizing the quality report to select a cell for a handover in response to predicted user experiences matching actual user experiences over a period of time. For example, if cell 112a determines that the predicted user experience for a plurality of user devices is highest for cell 112b, and those predicted user experiences match the actual user experiences after the handover to cell 112b, then cell 112a can automatically handover communications to cell 112b without analyzing the quality reports for cell 112b or other neighboring cells.

The operation of certain aspects will now be described with respect to FIGS. 2, 3, and 4. In at least one of various embodiments, processes 200, 300, and 400 described in conjunction with FIGS. 2, 3, and 4, respectively, may be implemented by or executed via circuitry or on one or more computing devices, such as cell quality server 102 or cell 112 in FIG. 1. For example, in some embodiments, cell quality server 102 may perform process 200 in FIG. 2 or process 300 in FIG. 3, whereas cell 112 may perform process 400 in FIG. 4. In other embodiments, processes 200, 300, and 400, or various portions thereof, may be performed by cell 112.

Figure 2:
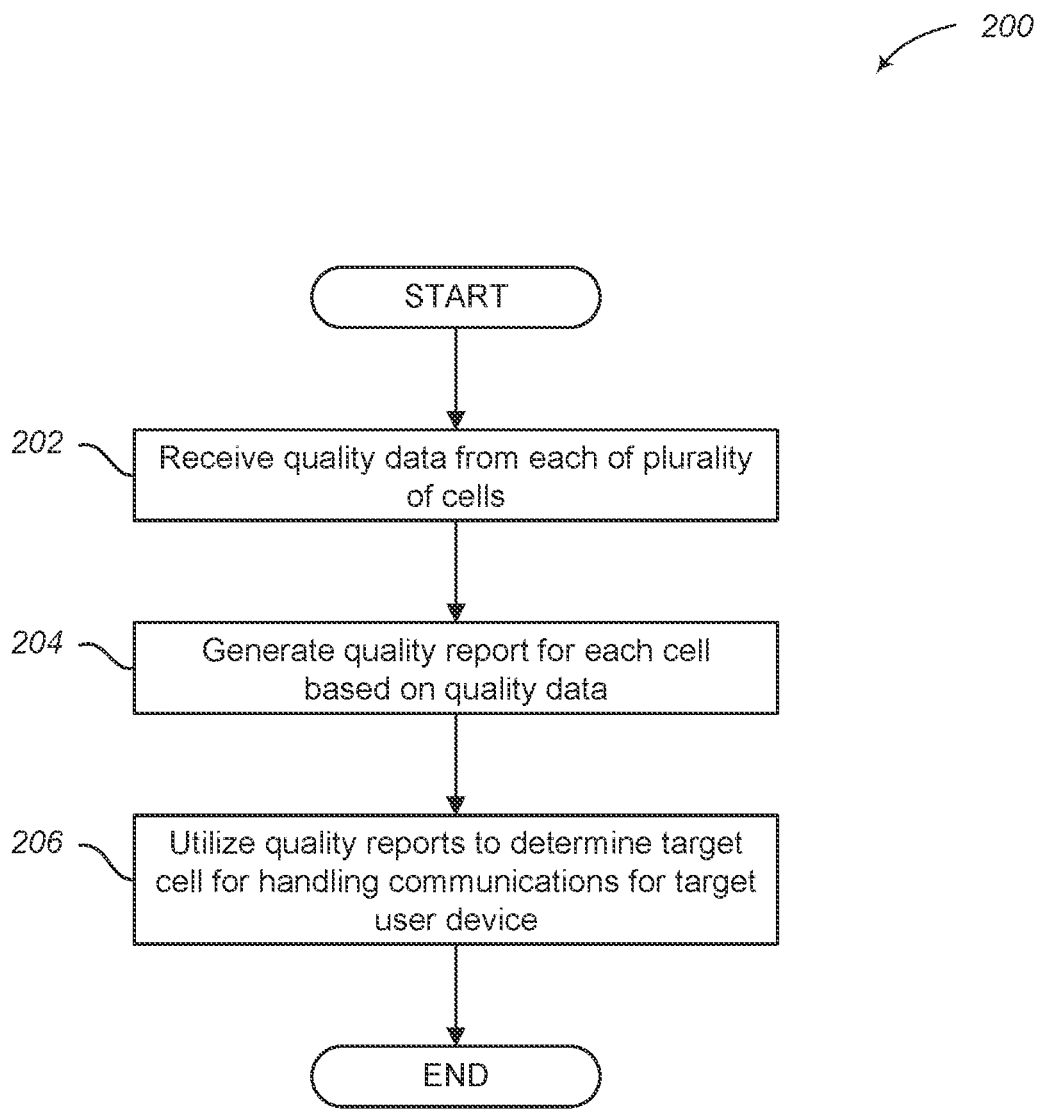
FIG. 2 illustrates a logical flow diagram showing one embodiment of a process for obtaining quality data and generating a quality report for user device mobility optimization in accordance with embodiments described herein.

FIG. 2 illustrates a logical flow diagram showing one embodiment of a process 200 for obtaining quality data and generating a quality report for user device mobility optimization in accordance with embodiments described herein.

Process 200 begins, after a start block, at block 202, where quality data is received from each of a plurality of cells. As described herein, the quality data from a corresponding cell may include channel-quality-indicator values, reference-signal-received-power values, and reference-signal-received-quality values for one or more frequency bands, which is obtained or collected from one or more user devices that are in communication with the corresponding cell.

Process 200 proceeds to block 204, where one or more quality reports are generated for each of the plurality of cells based on the received quality data. In various embodiments, one or more machine learning algorithms or statistical models may be employed on received data for a corresponding cell to generate the quality reports for that corresponding cell. As discussed in more detail herein, a plurality of quality reports may be generated for each separate cell based on different frequency bands, for different times of day or year, for different channel-quality-indicator values or ranges, etc.

Process 200 continues at block 206, where the quality reports are utilized to select a target cell to handle communications for a target user device. As described herein, the quality reports may be compared to determine a projected user experience that the target user device would experience with each of the plurality of cells. The cell having the best or highest projected user experience would be selected as the target cell to handle communications for the target user device.

After block 206, process 200 terminate or otherwise returns to a calling process to perform other actions.

Figure 3:
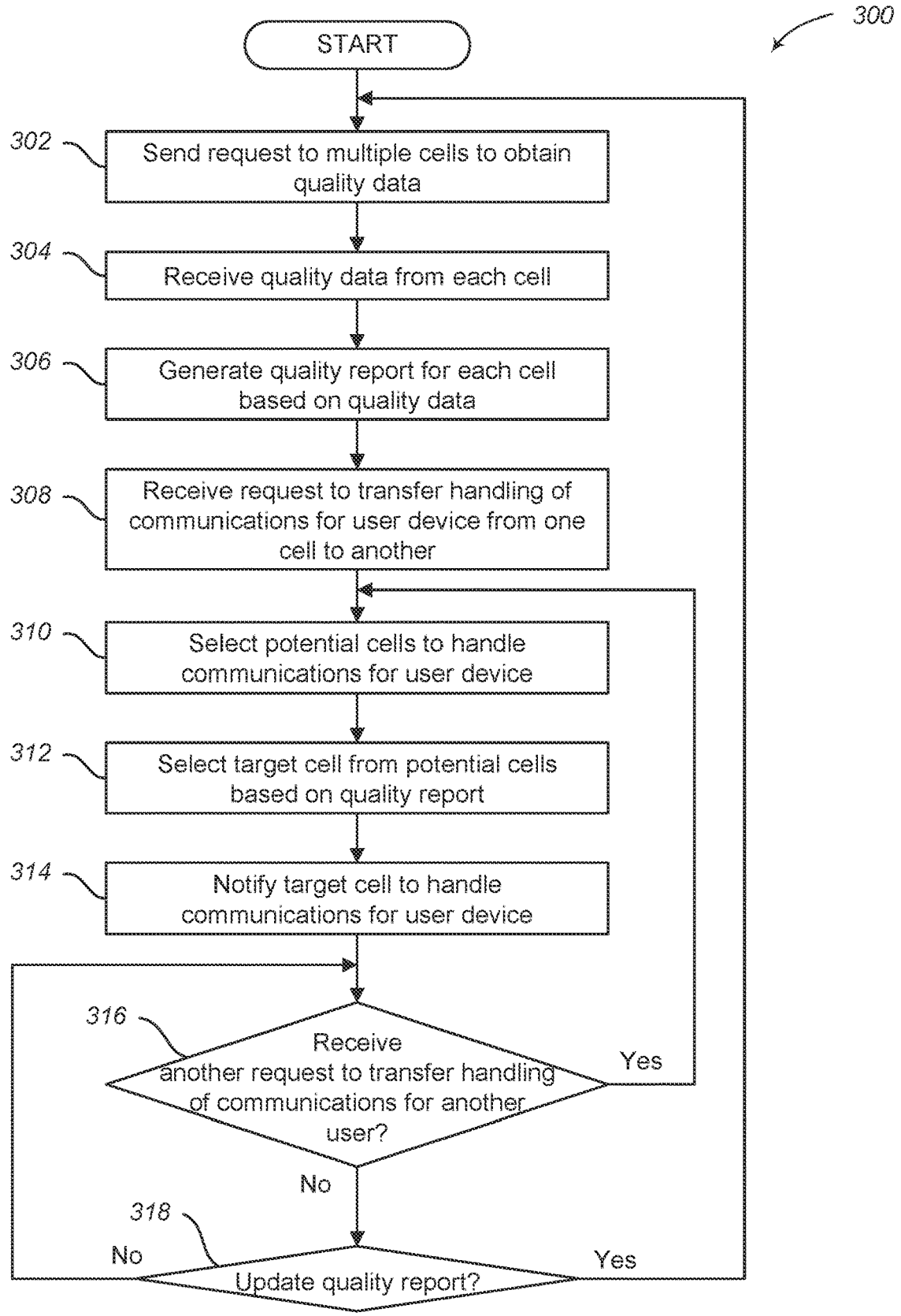
FIG. 3 illustrates a logical flow diagram showing one embodiment of another process for requesting quality data and generating a quality report for user device mobility optimization in accordance with embodiments described herein.

FIG. 3 illustrates a logical flow diagram showing one embodiment of a process 300 for requesting quality data and generating a quality report for user device mobility optimization in accordance with embodiments described herein. Process 300 begins, after a start block, at block 302, where a request for quality data is sent to one or more cells. This request is for each cell to obtain quality data from one or more user devices in communication with that corresponding cell.

In some embodiments, the request may be sent at predetermined times, at predetermined intervals, or in response to an administrator command. For example, a first request may be sent during a first time, such as during a morning commute, and a second request may be sent during a second time, such as during an evening commute. Accordingly, the request may be sent during different times of day, during different days, at different times of the year, during other select occasions (e.g., before, during, or after a sporting event). In this way, quality reports can be generated for cells for different time periods.

In some embodiments, the request may be sent to select cells. In at least one embodiment, the cells may be selected based on their location, the timing of when the request is sent, the amount of traffic managed by the cells, user-reported issues of specific cells, or other criteria in which the service quality of cells may be used to load balance or determine handovers of user devices, or some combination thereof.

Process 300 proceeds to block 304, where quality data is received from each cell. As described herein, the quality data from a corresponding cell may include channel-quality-indicator values, reference-signal-received-power values, and reference-signal-received-quality values that are obtained or collected from one or more user devices that are in communication with the corresponding cell. The corresponding cell may specifically request some or all of the quality data from the one or more user devices, which is described in more detail herein. The obtained quality data may also include the frequency band associated with the other collected quality data.

Process 300 continues at block 306, where a quality report is generated for each cell based on the received quality data. In various embodiments, one or more machine learning algorithms or statistical models may be employed on received data for a corresponding cell to generate the quality report for that corresponding cell. Such machine learning mechanisms or statistical models may include linear regression modelling, logistic regression, convolutional neural networks, artificial intelligence classifiers, or other model generation mechanisms.

In some embodiments, the same machine learning algorithms or statistical models are employed on the quality data for each cell. In other embodiments, different machine learning algorithms or statistical models may employed for different cells. The selection of which machine learning algorithm or statistical model to employ may be based on the location of a cell, the amount of quality data obtained from a cell, the use of the cell, the timing of when the quality data was obtained or collected, etc.

As mentioned above, the request to obtain quality data from the cells may be at different times of day, different times of year, different days of the week, or other time period. Accordingly, a separate quality report may be generated for each separate time period for each separate cell. Moreover, separate quality reports can be generated for different frequency bands for a given cell based on the collected quality data for different frequency bands. As a result, one quality report or a plurality of quality reports may be generated for each separate cell of a plurality of cells.

Process 300 proceeds next to block 308, where a request to transfer handling of communications for a user device is received. This request may be a handover request from a current cell to a target cell. In some embodiments, the request may be received from the current cell handling communications for the user device. The current cell may determine that a handover of the user device to another cell is needed due to movement of the user device (e.g., the user device is moving away from the current cell and about to be out of communication range of the current cell), load balancing operations associated with the current cell (e.g., the current cell is operating above threshold capacity and intends to handover the user device to another cell), decrease in quality or throughput to the user device (e.g., the communications between the user device and the current cell are being deteriorated, such as by obstacles, weather events, or other interference), or other criteria that would have a different cell from the current cell handle communications of the user device, or some combination thereof.

Process 300 continues next at block 310, where one or more potential cells are selected to handle communications for the user device. In various embodiments, the potential cells are selected from the plurality of cells in which a corresponding quality report was generated at block 306.

In some embodiments, the potential cells may be selected based on the movement of the user device (e.g., the user device is approaching or within communication range of one or more potential cells), load balancing operations associated with one or more potential cells (e.g., a potential cell has more throughput capability compared to the current cell), or other criteria that is assessed to determine if a potential cell could handle communications for the user device.

In other embodiments, the potential cells may be selected based on frequency bands. In at least one embodiment, the current cell handling communications for the user device may be selected as a potential cell for a frequency band that is different from a current frequency band being used by the user device. In another embodiment, a single cell may be selected as two separate potential cells for different frequency bands. Accordingly, a single cell may be selected as a first potential cell for a first frequency band and selected as a second potential cell in a second frequency band.

Process 300 proceeds to block 312, where a target cell is selected from the one or more potential cells based on the quality reports of the potential cells. As discussed herein, each potential cell is associated with a quality report that indicates the estimated quality of the communications between a user device and the potential cell. In situations where a potential cell is associated with a plurality of quality reports for different parameters, such as for different time periods or traffic conditions, then the quality report for parameters that best fit or match current parameters associated with the potential cell is selected.

The quality reports of the potential cells are then compared to one another or to one or more thresholds. In some embodiments, if the quality report of a potential cell exceeds a select threshold, then that potential cell may be selected as the target cell to handle communications for the user device. In other embodiments, the potential cell that demonstrates a highest performance or quality compared to other potential cells, then that potential cell may be selected as the target cell. For example, the quality report for a first potential cell may indicate that the average channel-quality-indicator value for the first potential cell is 7 and the average reference-signal-received-power value for the first potential cell is −89. In comparison, the quality report for a second potential cell may indicate that the average channel-quality-indicator value for the second potential cell is 8 and the average reference-signal-received-power value for the second potential cell is −85. In this case, the second potential cell is selected as the target cell to handle communications for the user device.

In some embodiments, the quality report for a potential cell may indicate or identify trends or tendencies using different distances from the potential cell. For example, the quality report for a potential cell may indicate that the average channel-quality-indicator value for the potential cell is 7 and the average reference-signal-received-power value for the potential cell is −89 when a user device is 225 meters from the cell, whereas the average channel-quality-indicator value for the potential cell is 3 and the average reference-signal-received-power value for the potential cell is −110 when a user device is 400 meters from the cell. Therefore, in some embodiments, projected distances between the user device and the potential cells may be used in conjunction with the quality reports to select the target cell.

As mentioned above, quality reports may also be generated for different frequency bands and the potential cells may be selected based on the different frequency bands. Accordingly, the target cell may be a different cell but the same frequency band, a different cell and a different frequency band, or the same cell but a different frequency band.

In other embodiments, current quality data, throughput data, load data, latency data, or other current metrics may be utilized in conjunction with the analysis and comparison of the quality reports for the potential cells. For example, the quality report for a first potential cell may indicate that the expected reference-signal-received-power value to be −89 when the channel-quality-indicator value is 7, whereas the quality report for a second potential cell may indicate that the expected reference-signal-received-power value to be −110 when the channel-quality-indicator value is 7. Thus, if the current channel-quality-indicator values being reported by user devices in communication with the first and second potential cells are both 7, then the comparison of the quality reports for the first and second potential cells predicts that the first potential cell will provide higher quality communications for the user device than the second potential cell. Accordingly, the first potential cell may be selected as the target cell.

Process 300 continues at block 314, where the target cell is notified to handle communications for the user device. In some embodiments, the current cell handling communications for the user device may be notified of the target cell so that the current cell and the target cell can collaborate and formally execute a handover from the current cell to the target cell.

Process 300 proceeds next to decision block 316, where a determination is made whether another request is received to transfer handling of communications for the user device or for another user device. If another request is received, then process 300 may loop to decision block 310 to select potential cells to handle the communications for the user device associated with the new request. If another request is not received, then process 300 flows from decision block 316 to decision block 318.

At decision block 318, a determination is made whether the quality report of one or more cells is to be updated. In some embodiments, an administrator may instruct the update to occur. In other embodiments, a change in various parameters associated with one or more cells may trigger the updating of the quality report, such as the addition of new cells proximate to other cells, changes in environmental conditions, changes in user device traffic, etc.

If the quality report is to be updated, process 300 loops to block 302 to request quality data from one or more cells; otherwise, process 300 loops to decision block 316 wait for another user device transfer request.

In at least some embodiments, actual quality data may be obtained for the user device after handover to the target cell. This actual quality data may be used as feedback as to the accuracy of the quality report for the target cell. In some embodiments, if the actual quality data exceeds a threshold different from the quality report prediction, then an update to the quality report may be triggered. In other embodiments, the actual quality data may be input as feedback or verified result into the machine learning mechanism to further improve, refine, or adjust the quality report for the cell.

Figure 4:
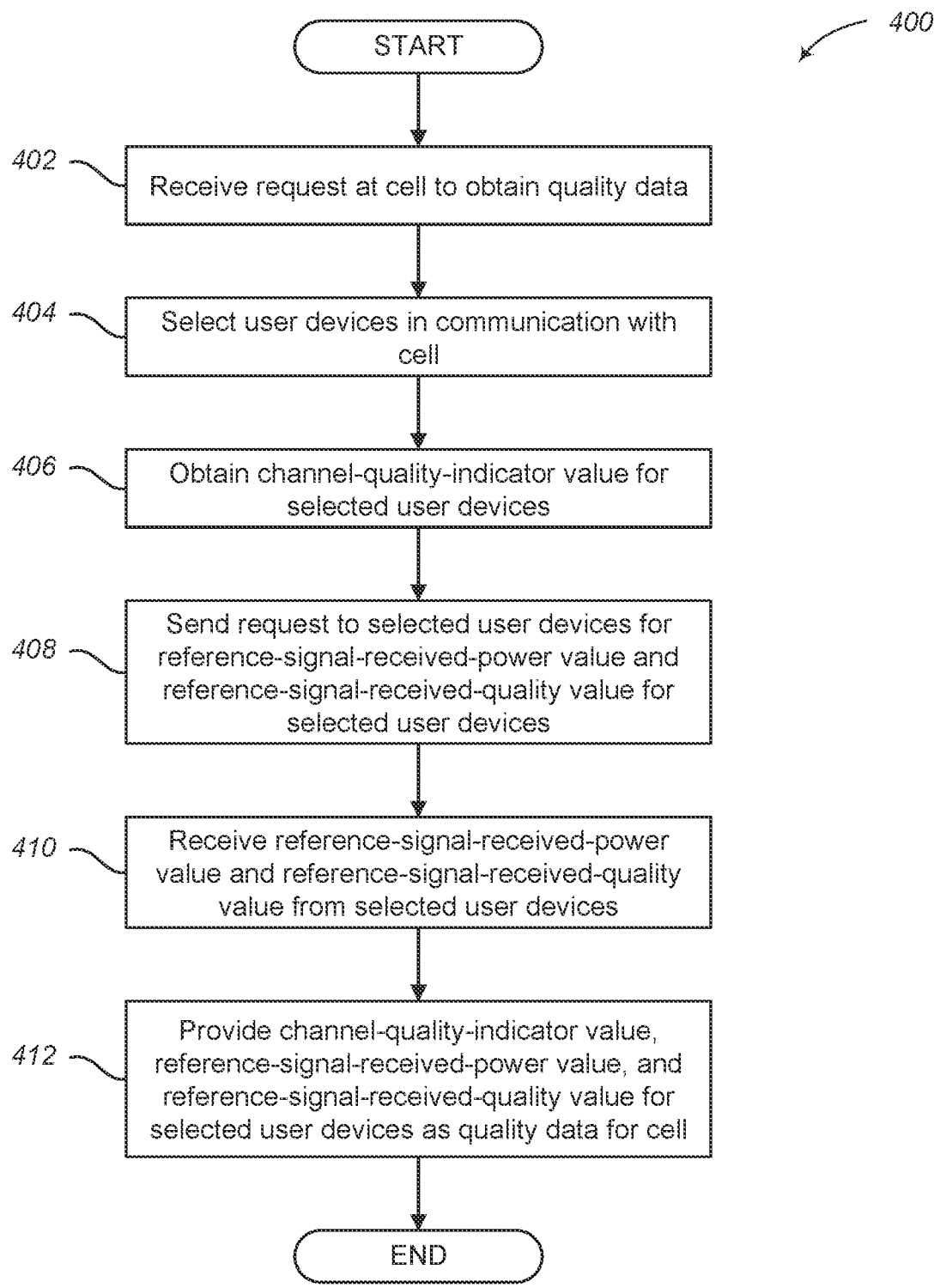
FIG. 4 illustrates a logical flow diagram showing one embodiment of a process for obtaining user device quality data in accordance with embodiments described herein.

FIG. 4 illustrates a logical flow diagram showing one embodiment of a process 400 for obtaining user device quality data in accordance with embodiments described herein. Process 400 begins, after a start block, at block 402, where a request is received at a cell to obtain quality data. In various embodiments, this received request is the request sent at block 302 in FIG. 3.

Process 400 proceeds to block 404, where one or more user devices in communication with the cell are selected. In some embodiments, a plurality of user devices are in communication with the cell and the selected user devices are those user devices that are transmitting or receiving data exceeding a threshold amount. In other embodiments, the selected user devices are those user devices that have sent or received data within the last threshold time period (e.g., five seconds). In yet other embodiments, the selected user devices are those user devices that are sending or receiving a select type of data, such as video data.

In various embodiments, the number of selected user devices may be a selected number of devices (e.g., five user devices). In other embodiments, the selected user devices may be user devices that have reported its connection quality with the cell within the last select number of reports. In some embodiments, the selected user devices are those user devices that have reported a channel-quality-indicator value of a select value. In other embodiments, the selected user devices are those user devices that have reported a channel-quality-indicator value between a select range. In yet other embodiments, the selected user devices are those user devices that have reported a channel-quality-indicator value the matches one of a plurality of different channel-quality-indicator values. In this way, the cell can obtain quality data for multiple different channel-quality-indicator values.

In some embodiments, the selected user devices are all user devices currently in communication with the cell. In other embodiments, the selected user devices are randomly selected from the plurality of user devices currently in communication with the cell.

The above examples of how the one or more user devices may be combined, such that the one or more user devices are selected based on a combination of multiple criteria. For example, the selected user devices may be those user devices that have reported a select channel-quality-indicator value in the last select number of reports while receiving video data. Other combinations of criteria may also be employed to select the one or more user devices in communication with the cell.

Process 400 continues at block 406, where a channel-quality-indicator value for the selected user devices is obtained. In various embodiments, the selected user devices may have already provided their channel-quality-indicator values to the cell as part of normal cellular communications between the selected user devices and the cell. In other embodiments, the cell may send a request to the selected user devices to provide their current channel-quality-indicator values.

Process 400 proceeds next to block 408, where the cell sends a request to each selected user device for select connection quality data. In some embodiments, the request is for each selected user device to send a current reference-signal-received-power value between the user device and the cell. In other embodiments, the request is for each selected user device to send a current reference-signal-received-quality value between the user device and the cell. In yet other embodiments, the request is for each selected user device to send both the current reference-signal-received-power value and the current reference-signal-received-quality value between the user device and the cell. Although reference-signal-received-power and reference-signal-received-quality are described as being collected from the selected user devices, embodiments are not so limited and other types of connection quality information or metrics may also be collected from the user device. For example, signal-to-noise ratio may also be obtained from each selected user device.

In some embodiments, the request may be for a select number of different quality data values over a period of time. For example, the request may be for the selected user devices to obtain reference-signal-received-power values and reference-signal-received-quality values every 0.5 seconds for 5 seconds. Once collected, the selected user devices can respond to the cell will the collected quality data.

Process 400 continues next to block 410, where the cell receives the requested reference-signal-received-power values and reference-signal-received-quality values from the selected user devices.

Process 400 proceeds to block 412, where the cell provides the obtained quality data for the cell to the requesting device. In various embodiments, the cell provides the channel-quality-indicator values, the received reference-signal-received-power values, and the received reference-signal-received-quality to the requesting device as the quality data.

After block 412, process 400 terminates or otherwise returns to a calling process to perform other actions. For example, as discussed above, the device requesting the cell quality data performs one or more machine learning mechanisms on the quality data to generate a quality report or model for the cell. In this way, the quality report for that cell can be used to predict the connection quality between the cell and a target user device.

Figure 5:
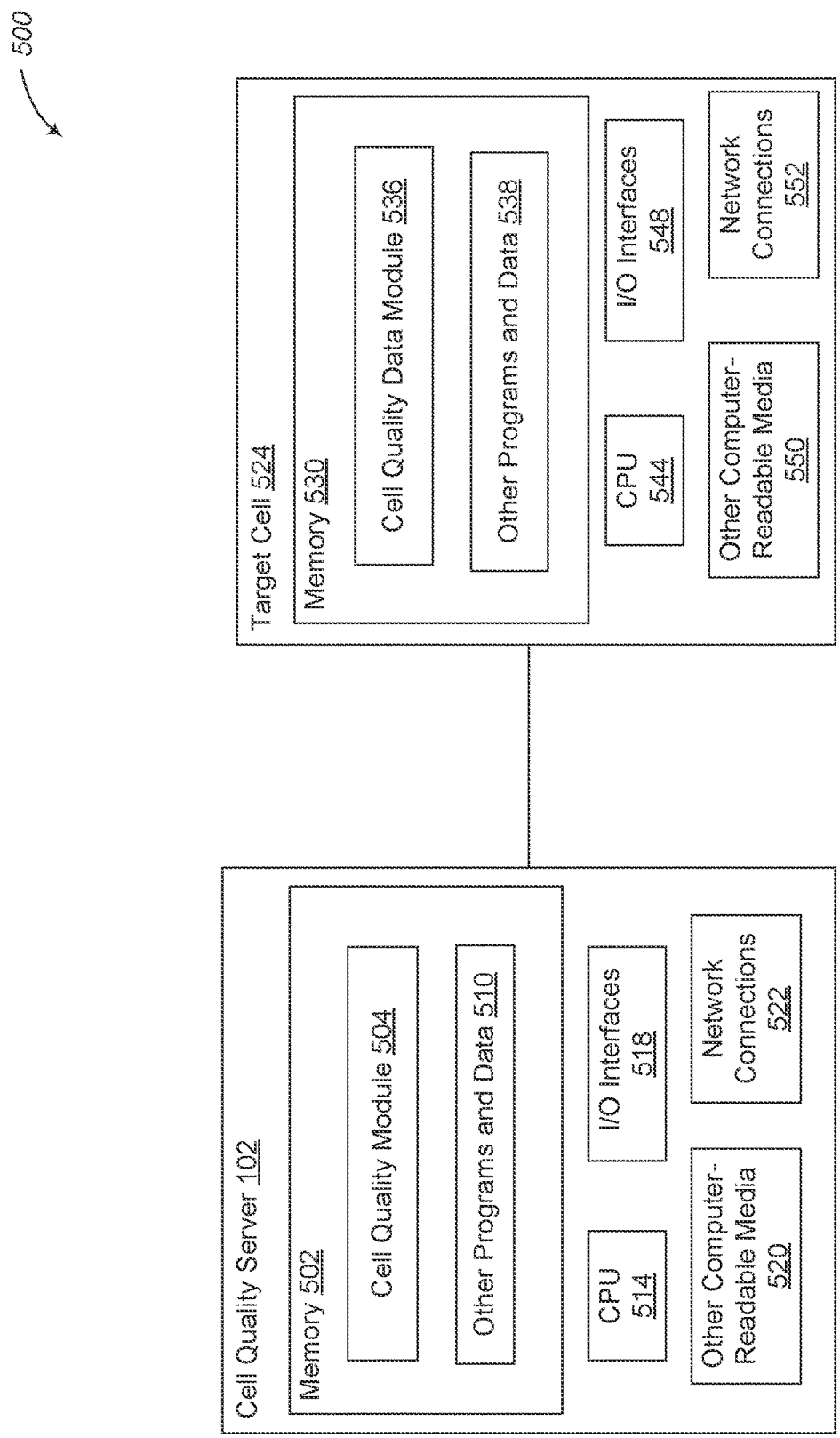
FIG. 5 shows a system diagram that describe various implementations of computing systems for implementing embodiments described herein.

FIG. 5 shows a system diagram that describe various implementations of computing systems for implementing embodiments described herein. System 500 includes a cell quality server 102 and a target cell 524. The target cell 524 may include one or more cells 112 from FIG. 1.

The cell quality server 102 requests quality data from the target cell 524 and determines if a target user device (not illustrated) is to communicate with the target cell 524 or another cell (not illustrated) based on the quality data. One or more special-purpose computing systems may be used to implement cell quality server 102. Accordingly, various embodiments described herein may be implemented in software, hardware, firmware, or in some combination thereof. Cell quality server 102 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 502 may be utilized to store information, including computer-readable instructions that are utilized by CPU 514 to perform actions, including embodiments described herein.

Memory 502 may have stored thereon cell quality module 504. The cell quality module 504 is configured to request and obtain quality data from a plurality of cells, including target cell 524, which may include employing embodiments of processes 200 or 300 in conjunction with FIGS. 2 and 3. The cell quality module 504 employs one or more machine learning mechanisms on the quality data to generate a quality report for each target cell 524, as described herein. In some embodiments, the cell quality module 504 may also receive a request from a cell to handover communications for a target user device. The cell quality module 504 may utilize the quality reports for a plurality of cells, along with other information (e.g., load balancing data), to select and inform a particular target cell to handle communications for the target user device, as described herein.

Memory 502 may also store other programs and data 510, which may include cell capabilities, current cell loads, current cell latency, etc.

Network connections 522 are configured to communicate with other computing devices to facilitate the collection of quality data and generation of quality reports for a plurality of cells, as described herein. In various embodiments, the network connections 522 include transmitters and receivers (not illustrated) to send and receive data as described herein. I/O interfaces 518 may include a video or audio interfaces, other data input or output interfaces, or the like, which can be used to receive or output information to an administrator, among other actions. Other computer-readable media 520 may include other types of stationary or removable computer-readable media, such as removable flash drives, external hard drives, or the like.

Target cell 524 handles cellular network traffic for one or more user devices. The target cell 524 can request specific connection quality data from selected user devices that are in communication with the target cell 524, as described herein. The target cell 524 can provide the collected quality data to the cell quality server 102 for the cell quality server 102 to generate one or more quality reports for the target cell 524. In some embodiments, the target cell 524 may utilize the collected quality data to generate its own quality reports, which can then coordinate with other cells to determine which cell is to handle communications for a target user device. One or more special-purpose computing systems may be used to implement target cell 524. Accordingly, various embodiments described herein may be implemented in software, hardware, firmware, or in some combination thereof. Target cell 524 may include memory 530, one or more central processing units (CPUs) 544, I/O interfaces 548, other computer-readable media 550, and network connections 552.

Memory 530 may include one or more various types of non-volatile and/or volatile storage technologies similar to memory 502. Memory 530 may be utilized to store information, including computer-readable instructions that are utilized by CPU 544 to perform actions, including embodiments described herein.

Memory 530 may have stored thereon cell quality data module 536. The cell quality data module 536 receives a request, whether provided by cell quality server 102 or generated by the target cell 524, to collect user device quality data from user devices in communication with the target cell 524, which may include employing embodiments of process 400 in conjunction with FIG. 4. Once collected, the cell quality data module 536 may provide the quality data to the cell quality server 102. In some embodiments, the cell quality data module 536 may perform embodiments of the cell quality module 504 of the cell quality server 102 to generate its own quality reports, as described herein. Memory 530 may also store other programs and data 538, which may include capabilities of the target cell 524, the obtained quality data, a list of current user devices in communication with the target cell 524, etc.

Network connections 552 are configured to communicate with other computing devices, such as cell quality server 102 or other cells. In various embodiments, the network connections 552 include transmitters and receivers (not illustrated) to send and receive data as described herein. I/O interfaces 548 may include one or more other data input or output interfaces. Other computer-readable media 550 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A system, comprising:
a plurality of cells in a network, each corresponding cell of the plurality of cells includes:
a first memory that stores first computer instructions; and
a first processor that executes the first computer instructions to perform first actions, the first actions including:
receiving a request to obtain quality data from user devices having a selected channel-quality-indicator value in communication with the corresponding cell;

obtaining a channel-quality-indicator value for each user device in communication with the corresponding cell;

selecting, based on the obtained channel-quality-indicator values, one or more user devices in communication with the corresponding cell that have the selected channel-quality-indicator value;

sending a request to each corresponding user device of the selected one or more user devices for a reference-signal-received-power value and a reference-signal-received-quality value for the corresponding user device for the selected channel-quality-indicator value; and obtaining the reference-signal-received-power value and the reference-signal-received-quality value for each of the selected one or more user devices for the selected channel-quality-indicator value; and a cell quality server that includes:
a second memory that stores second computer instructions; and
a second processor that executes the second computer instructions to perform second actions, the second actions including:
sending the request to each of the plurality of cells to obtain the quality data for the selected channel-quality-indicator value;
receiving, from the plurality of cells, the quality data including the reference-signal-received-power values, and the reference-signal-received-quality values for each of the selected one or more user devices for the selected channel-quality-indicator value;
generating a quality report for each cell of the plurality of cells based on the quality data:
receiving a request to handover communications for a target user device from a first cell to a second cell of the plurality of cells; and
handing over communications for the target user device from the first cell to the second cell based on an estimated reference-signal-received-power value and an estimated reference-signal-received-quality value for the selected channel-quality-indicator value for the second cell for the target user device generated from the reference-signal-received-power values and the reference-signal-received-quality values in the quality report for the second cell.

2. The system of claim 1, wherein the second processor of the cell quality server executes the second computer instructions to perform further actions, the further actions comprising:
receiving a request to handover communications for a target user device from a first cell to a second cell;
identifying one or more potential cells from the plurality of cells; and
selecting the second cell from the one or more potential cells based on the quality report.

3. The system of claim 2, wherein the second processor of the cell quality server selects the second cell by executing the second computer instructions to perform further actions, the further actions comprising:
estimating a first predictive user quality indicator between the target user device and a first potential cell of the one or more potential cells for the selected channel-quality-indicator value based on the reference-signal-received-power values and the reference-signal-received-quality values received from the first potential cell for the selected channel-quality-indicator value;

estimating a second predictive user quality indicator between the target user device and a second potential cell of the one or more potential cells for the selected channel-quality-indicator value based on the reference-signal-received-power values and the reference-signal-received-quality values received from the second potential cell for the selected channel-quality-indicator value; and selecting the first potential cell as the second cell in response to a determination that the first predictive user quality indicator exceeds the second predictive user quality indicator.

4. The system of claim 2, wherein the second processor of the cell quality server selects the second cell by executing the second computer instructions to perform further actions, the further actions comprising:
determining an estimated reference-signal-received-power value and estimated reference-signal-received-quality value for a target channel-quality-indicator value level for the second cell based on the reference-signal-received-power values and the reference-signal-received-quality values received from the second cell for a plurality of channel-quality-indicator values; and
selecting the second cell to handle communications for the target user device in response to the estimated reference-signal-received-power value and estimated reference-signal-received-quality value exceeding threshold values.

5. The system of claim 1, wherein the second processor of the cell quality server receives the quality data by executing the second computer instructions to perform further actions, the further actions comprising:
receiving a separate plurality of reference-signal-received-power values for each of a plurality of channel-quality-indicator-value levels.

6. The system of claim 1, wherein the second processor of the cell quality server receives the quality data by executing the second computer instructions to perform further actions, the further actions comprising:
receiving a separate plurality of reference-signal-received-quality values for each of a plurality of channel-quality-indicator-value levels.

7. The system of claim 1, wherein the second processor of the cell quality server generates the quality report for each cell of the plurality of cells by executing the second computer instructions to perform further actions, the further actions comprising:
for each target cell of the plurality of cells, employing a machine learning mechanism on the reference-signal-received-power values and the reference-signal-received-quality values for each of the selected one or more user devices selected by the target cell to generate a quality model for the target cell.

8. A method, comprising:
receiving, from a plurality of cells in a cellular network, quality data for each user device of one or more user devices in communication with each corresponding cell of the plurality of cells, wherein the quality data of a user device indicates a reference-signal-received-power value and a reference-signal-received-quality value and a corresponding channel-quality-indicator value;

generating a quality report for each corresponding cell of the plurality of cells for each of a plurality of channel-quality-indicator values based on the received reference-signal-received-power values and the received reference-signal-received-quality values; and utilizing the generated quality reports to determine which of the plurality of cells is to handle communications for a target user device for a target channel-quality-indicator value.

9. The method of claim 8, further comprising:
sending a request to each corresponding cell of the plurality of cells to obtain the reference-signal-received-power values and the reference-signal-received-quality values from the one or more user devices in communication with the corresponding cell for the target channel-quality-indicator value.

10. The method of claim 8, further comprising:
identifying a plurality of user devices in communication with a cell of the plurality of cells; and
selecting the one or more user devices from the plurality of user devices based on the one or more user devices exceeding a communication threshold with the cell for the target channel-quality-indicator value.

11. The method of claim 8, further comprising:
receiving actual quality data from the target user device while in communication with a cell of the plurality of cells; and
updating the quality report for the cell based on the actual quality data.

12. The method of claim 8, wherein utilizing the generated quality report to determine which of the plurality of cells is to handle communications for the target user device further comprises:
receiving a request to handover communications for the target user device from a first cell to a second cell of the plurality of cells;
identifying one or more potential cells from the plurality of cells; and
selecting the second cell from the one or more potential cells based on the generated quality reports.

13. The method of claim 8, wherein utilizing the generated quality report to determine which of the plurality of cells is to handle communications for the target user device further comprises:
estimating a first predictive user quality indicator for a first potential cell of the plurality of cells for the target channel-quality-indicator value based on the reference-signal-received-power values and the reference-signal-received-quality values received from the first potential cell for the target channel-quality-indicator value;
estimating a second predictive user quality indicator for a second potential cell of the plurality of cells for the target channel-quality-indicator value based on the reference-signal-received-power values and the reference-signal-received-quality values received from the second potential cell for the target channel-quality-indicator value; and
selecting the first potential cell to handle communications for the target user device in response to a determination that the first predictive user quality indicator exceeds the second predictive user quality indicator.

14. The method of claim 8, wherein utilizing the generated quality report to determine which of the plurality of cells is to handle communications for the target user device further comprises:
determining an estimated reference-signal-received-power value and estimated reference-signal-received-quality value for the target channel-quality-indicator value for each corresponding cell of the plurality of cells based on the reference-signal-received-power values and the reference-signal-received-quality values received from the corresponding cell for the target channel-quality-indicator value; and
selecting a target cell to handle communications for the target user device in response to the estimated reference-signal-received-power value and estimated reference-signal-received-quality value for the target cell exceeding threshold values.

15. The method of claim 8, wherein receiving the reference-signal-received-power values further comprises:
receiving, for each corresponding cell of the plurality of cells, a separate plurality of reference-signal-received-power values for each of a plurality of channel-quality-indicator-value levels.

16. The method of claim 8, wherein receiving the reference-signal-received-quality values further comprises:
receiving, for each corresponding cell of the plurality of cells, a separate plurality of reference-signal-received-quality values for each of a plurality of channel-quality-indicator-value levels.

17. The method of claim 8, wherein generating the quality report for each corresponding cell of the plurality of cells further comprises:
for each corresponding cell of the plurality of cells, employing a machine learning mechanism on the reference-signal-received-power values and the reference-signal-received-quality values for the corresponding channel-quality-indicator value for each of the one or more user devices in communication with the corresponding cell to generate a quality model for the corresponding cell.

18. A computing device, comprising:
a memory that stores second computer instructions; and
a second processor is configured to execute the computer instructions to:
send a request to each corresponding cell of a plurality of cells to obtain user-device-generated connection quality data from user devices in communication with the corresponding cell having a selected channel-quality-indicator value;
receive the user-device-generated connection quality data for the selected channel-quality-indicator value from the plurality of cells;
generate a quality report for each corresponding cell of the plurality of cells based on the user-device-generated connection quality data received for the corresponding cell;
receive a request to handover communications for a target user device from a first cell to a second cell of the plurality of cells;
identify a first potential cell from the plurality of cells to handle communications for the target user device for the selected channel-quality-indicator value;
identify a second potential cell from the plurality of cells to handle communications for the target user device for the selected channel-quality-indicator value; and
select the second potential cell to handle communications for the target user device based on a comparison between the quality reports for the first potential cell and the second potential cell for the selected channel-quality-indicator value.

19. The computing device of claim 18, wherein the processor is configured to further execute the computer instructions to:

receive actual quality data from the target user device while in communication with the second potential cell; and updating the quality report for the second potential cell based on the actual quality data.

20. The computing device of claim 18, wherein the processor receives the user-device-generated connection quality data from the plurality of cells by being configured to further execute the computer instructions to:

receive, form each corresponding cell of the plurality of cells, at least one of reference-signal-received-power values or reference-signal-received-quality values provided by the user devices in communication with the corresponding cell for the selected channel-quality-indicator value.

* * * * *

UNITED STATES PATENT AND TRADEMARK OFFICE
CERTIFICATE OF CORRECTION

| | | |
|---|---|---|
| PATENT NO. | : 12,041,507 B2 | Page 1 of 1 |
| APPLICATION NO. | : 17/353568 | |
| DATED | : July 16, 2024 | |
| INVENTOR(S) | : Dhaval Mehta et al. | |

It is certified that error appears in the above-identified patent and that said Letters Patent is hereby corrected as shown below:

In the Claims

<u>Column 13, Claim 1, Line 35:</u>
"on the quality data:"
Should read:
--on the quality data;--.

Signed and Sealed this
Seventeenth Day of September, 2024

Katherine Kelly Vidal
*Director of the United States Patent and Trademark Office*